US012633619B2

(12) United States Patent
Kim et al.

(10) Patent No.: US 12,633,619 B2
(45) Date of Patent: May 19, 2026

(54) SECONDARY BATTERY

(71) Applicant: Samsung SDI Co., Ltd., Yongin-si (KR)

(72) Inventors: Shin Jung Kim, Yongin-si (KR); Dae Kyu Kim, Yongin-si (KR); Jin Young Moon, Yongin-si (KR); Jong Ha Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 724 days.

(21) Appl. No.: 17/905,814

(22) PCT Filed: Feb. 10, 2021

(86) PCT No.: PCT/KR2021/001852
§ 371 (c)(1),
(2) Date: Sep. 7, 2022

(87) PCT Pub. No.: WO2021/187755
PCT Pub. Date: Sep. 23, 2021

(65) Prior Publication Data
US 2023/0119225 A1 Apr. 20, 2023

(30) Foreign Application Priority Data

Mar. 17, 2020 (KR) ........................ 10-2020-0032708

(51) Int. Cl.
*H01M 50/392* (2021.01)
*H01M 4/62* (2006.01)
*H01M 50/152* (2021.01)

(52) U.S. Cl.
CPC ......... *H01M 50/392* (2021.01); *H01M 4/623* (2013.01); *H01M 50/152* (2021.01)

(58) Field of Classification Search
CPC ... H01M 50/392; H01M 50/152; H01M 4/623
See application file for complete search history.

(56) References Cited

U.S. PATENT DOCUMENTS

| | | | |
|---|---|---|---|
| 8,936,862 B2 | 1/2015 | Kobayashi et al. | |
| 9,716,275 B2 | 7/2017 | Kobayashi et al. | |

(Continued)

FOREIGN PATENT DOCUMENTS

| | | |
|---|---|---|
| CN | 102195075 A | 9/2011 |
| CN | 109155390 A | 1/2019 |

(Continued)

OTHER PUBLICATIONS

Chinese Office Action for CN Application No. 202180017620.4 dated Nov. 21, 2023, 16 pages.

(Continued)

*Primary Examiner* — Alexander Usyatinsky
(74) *Attorney, Agent, or Firm* — Womble Bond Dickinson (US) LLP

(57) ABSTRACT

An embodiment of the present invention relates to a secondary battery, and a technical issue to address is to provide a secondary battery having excellent stability. To this end, disclosed is a secondary battery, comprising: an electrode assembly; a can which accommodates the electrode assembly and an electrolyte, and has a beading part formed above the electrode assembly; a cap assembly for sealing the can; and an adsorption member which is disposed in a space including at least a gap between the electrode assembly and the beading part, and which reacts with the electrolyte after a specific time period lapses after coming into contact with the electrolyte, thereby adsorbing the electrolyte.

9 Claims, 4 Drawing Sheets

100

(56)      References Cited

U.S. PATENT DOCUMENTS

| | | | |
|---|---|---|---|
| 10,734,694 | B2 | 8/2020 | Jeong et al. |
| 2003/0091904 | A1 | 5/2003 | Munshi |
| 2011/0123853 | A1* | 5/2011 | Kim .................... H01M 50/392 |
| | | | 429/186 |
| 2011/0217589 | A1 | 9/2011 | Kobayashi et al. |
| 2013/0216870 | A1* | 8/2013 | Kim .................... H01M 50/107 |
| | | | 429/61 |
| 2014/0186663 | A1* | 7/2014 | Hiroki ................. H01M 50/394 |
| | | | 429/57 |
| 2015/0004446 | A1* | 1/2015 | Kim .................... H01M 10/058 |
| | | | 29/623.2 |
| 2015/0079441 | A1 | 3/2015 | Kobayashi et al. |
| 2019/0267685 | A1 | 8/2019 | Jeong et al. |
| 2020/0185794 | A1 | 6/2020 | Jeong et al. |

FOREIGN PATENT DOCUMENTS

| | | | | | |
|---|---|---|---|---|---|
| JP | 2010-55987 | A | | 3/2010 | |
| JP | 2011-082001 | A | | 4/2011 | |
| KR | 20070006248 | A | * | 1/2007 | ......... H01M 50/107 |
| KR | 10-2011-0057987 | A | | 6/2011 | |
| KR | 10-2014-0086874 | A | | 7/2014 | |
| KR | 10-2014-0121759 | A | | 10/2014 | |
| KR | 10-1831166 | B1 | | 2/2018 | |
| KR | 10-2019-0084794 | A | | 7/2019 | |

OTHER PUBLICATIONS

International Search Report of PCT/KR2021/001852, May 31, 2021, 5 pp.

* cited by examiner

100

200

300

121

340

120

112   113   111

110

400

121

440

120

112   113   111

110

SECONDARY BATTERY

CROSS-REFERENCE TO RELATED APPLICATIONS

This application is a U.S. National Phase Patent Application of International Application Number PCT/KR2021/001852, filed on Feb. 10, 2021, which claims priority to Korean Patent Application Number 10-2020-0032708, filed on Mar. 17, 2020, the entire content of each of which is incorporated herein by reference.

TECHNICAL FIELD

An embodiment of the present invention relates to a secondary battery.

BACKGROUND ART

Unlike primary batteries that are not rechargeable, secondary batteries refer to batteries that are chargeable and dischargeable. Low-capacity secondary batteries are mainly used for portable small electronic devices, such as smartphones, laptop computers, digital cameras, and camcorders, and large-capacity secondary batteries are widely used for motor driving and power storage in hybrid vehicles, electric vehicles, and so on. Accordingly, secondary batteries are required to have characteristics such as high density, high output, and stability.

The above information disclosed in this Background section is only for enhancement of understanding of the background of the invention and therefore it may contain information that does not constitute prior art.

DESCRIPTION OF EMBODIMENTS

Technical Problem

An embodiment of the present invention provides a secondary battery having excellent stability.

Solution to Problem

A secondary battery according to an embodiment of the present invention may include an electrode assembly; a can which accommodates the electrode assembly and an electrolyte, and has a beading part formed above the electrode assembly; a cap assembly for sealing the can; and an adsorption member which is disposed in a space including at least a gap between the electrode assembly and the beading part, and which reacts with the electrolyte after a specific time period lapses after coming into contact with the electrolyte, thereby adsorbing the electrolyte.

In addition, the adsorption member is made of at least a material containing an acrylic binder, oriented polystyrene (OPS) or polyvinylidene fluoride (PVdF).

In addition, the secondary battery may further include an insulation member which is made of a material that does not react with the electrolyte and is disposed between the electrode assembly and the adsorption member.

In addition, the insulation member may be formed in the form of a film.

In addition, the adsorption member and the insulation member may be coupled to each other.

In addition, the adsorption member may be formed in a shape corresponding to the beading part.

In addition, the adsorption member may be formed in the form of a sheet, and the edge thereof may be bent upward.

Advantageous Effects of Disclosure

An embodiment of the present invention provides a secondary battery capable of preventing corrosion of a beading part and solving low voltage expression by allowing an adsorption member to adsorb an electrolyte, even if a negative electrode expands due to charging after assembling of the secondary battery is completed and the electrolyte is partially pushed into isolated voids under the beading part.

BEST MODE

Figure 1:
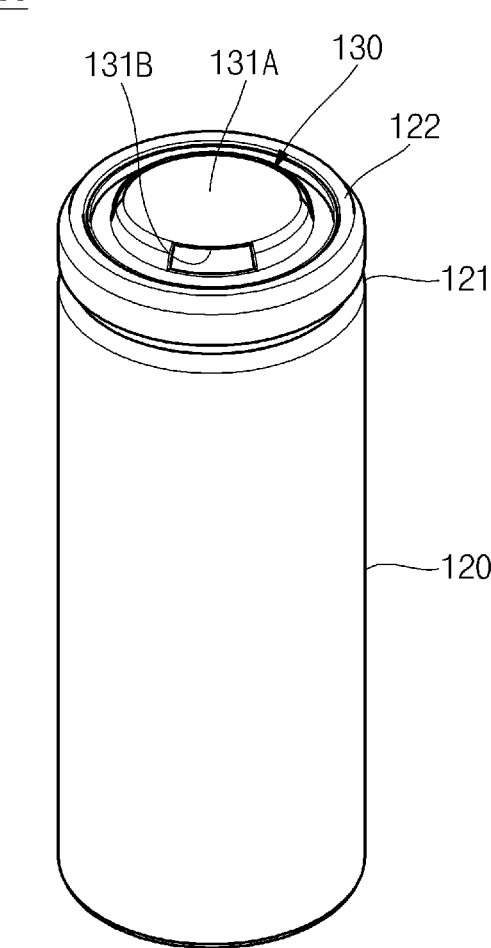
FIG. 1 is a perspective view of a secondary battery according to an embodiment of the present invention.

Hereinafter, preferred embodiments of the present invention will be described in detail with reference to the accompanying drawings.

Examples of the present invention are provided to more completely explain the present invention to those skilled in the art, and the following examples may be modified in various other forms. The present invention, however, may be embodied in many different forms and should not be construed as being limited to the example (or exemplary) embodiments set forth herein. Rather, these example embodiments are provided so that this disclosure will be thorough and complete and will convey the aspects and features of the present invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 2:
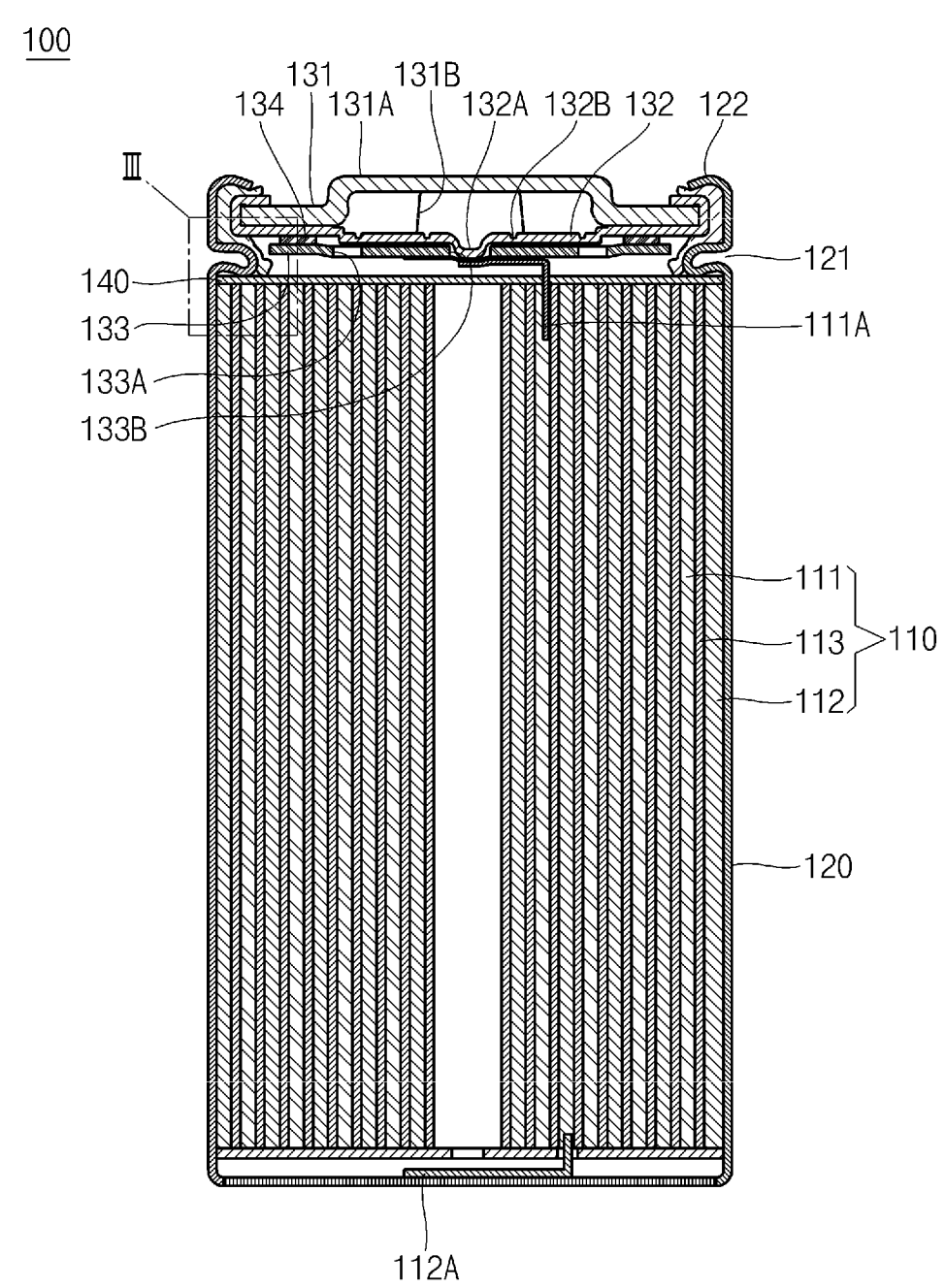
FIG. 2 is a cross-sectional view of the secondary battery according to an embodiment of the present invention.
Figure 3:
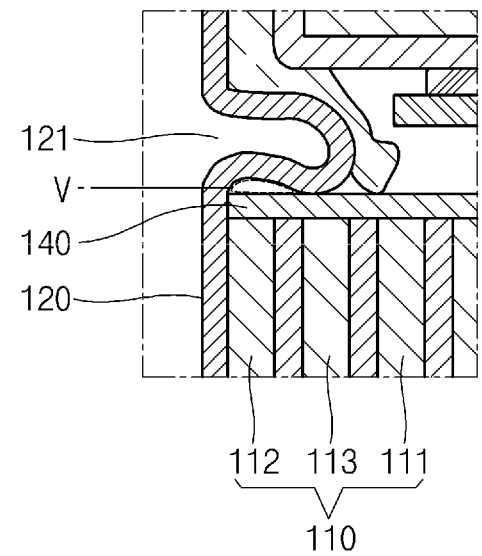
FIG. 3 is an enlarged view of a portion III in FIG. 2.

FIG. 1 is a perspective view of a secondary battery 100 according to an embodiment of the present invention, FIG. 2 is a cross-sectional view of the secondary battery 100 according to an embodiment of the present invention, and FIG. 3 is an enlarged view of a portion III in FIG. 2.

Referring to FIGS. 1 to 3, the secondary battery 100 according to an embodiment of the present invention includes an electrode assembly 110, a can 120, a cap assembly 130, and an adsorption member 140.

The electrode assembly 110 may include a first electrode 111, a second electrode 112, and a separator 113, and may be wound in a so-called jelly roll shape.

The first electrode 111 has a first coated portion formed by applying and rolling a first active material to a first substrate and a first uncoated portion to which the first active material is not applied. In addition, a first tab 111A may be drawn upwardly from the first uncoated portion, and may be electrically connected to the cap assembly 130 to be described later. The first electrode 111 may serve as a positive electrode. In this case, the first substrate may be made of, for example, an aluminum foil, and the first active material may be made of, for example, a transition metal oxide.

The second electrode 112 has a second coated portion formed applying and rolling a second active material to a second substrate and a second uncoated portion to which the second active material is not applied. In addition, a second tab 112A may be drawn upwardly from the second uncoated portion, and may be electrically connected to the can 120 to be described later. The second electrode 112 may serve as a negative electrode. In this case, the second substrate may be made of, for example, a copper or nickel foil, and the second active material may be made of, for example, graphite.

The separator 113 is interposed between the first electrode 111 and the second electrode 112 to prevent a short circuit between the first electrode 111 and the second electrode 112, while serving to allow the movement of lithium ions. The separator 113 may be made of, for example, a polyethylene or polypropylene film, or a composite film of polyethylene and polypropylene.

The can 120 accommodates the electrode assembly 110 and an electrolyte. In the drawings, the can 120 is illustrated as being generally formed in a cylindrical shape, but the technical idea of the present invention is not necessarily limited to a cylindrical secondary battery. However, hereinafter, for convenience, a cylindrical secondary battery will be described as an example.

The can 120 has an opened upper surface at an initial stage. Accordingly, after the electrode assembly 110 is installed in the can 120 through the upper surface and the electrolyte is injected, a beading part 121 for preventing the electrode assembly 110 from moving is formed. Then, after the cap assembly 130 is installed on the beading part 121, a crimping part 122 for fixing the cap assembly 130 may be formed and finished.

The can 120 may be made of, for example, nickel-plated iron.

In addition, the electrolyte may include, for example, an organic solvent, such as ethylene carbonate (EC), propylene carbonate (PC), diethyl carbonate (DEC), dimethyl carbonate (DMC), or ethyl methyl carbonate (EMC), and a lithium salt, such as $LiPF_6$ or $LibF_4$.

The cap assembly 130 is for sealing the can 120, and includes a cap-up 131, a safety vent 132, a cap-down 133, and an insulator 134.

The cap-up 131 convexly protrudes upward and has a terminal portion 131A for connection to an external circuit and an outlet 131B formed around the terminal portion 131A to discharging gas.

The safety vent 132 is disposed under the cap-up 131. In addition, the safety vent 132 has a protrusion 132A and a notch 132B convexly protruding downward and electrically connected to the first tab 111A. When gas is generated inside the safety vent 132 due to overcharging or abnormal operation of the secondary battery 100, the protrusion 132A is deformed upward by the pressure, and is separated from the first tab 111A, while being cut along the notch 132B, so that the gas is discharged, thereby preventing explosion of the secondary battery 100.

The cap down 133 is disposed under the safety vent 132. In addition, the cap down 133 has a through hole 133A in which the protrusion 132A of the safety vent 132 is located, and an outlet 133B for discharging gas when the gas is generated therein, as described above.

The insulator 134 is disposed between the safety vent 132 and the cap down 133 to insulate the safety vent 132 and the cap down 133 from each other.

Frequently, in the secondary battery 100, as described above, after the electrode assembly 110 is installed in the can 120 and the electrolyte is injected, the beading part 121 is formed, and, after installing the cap assembly 130 on the beading part 121, the beading part 121 may be pressed by the pressure during a process of forming the crimping part 122, and thus an isolated void V may be produced under the beading part 121.

Accordingly, when the second electrode (i.e., the negative electrode) 112 expands due to charging, the electrolyte may be partially pushed into the corresponding void V, and may come into contact with the beading part 121. In other words, the electrode assembly 110 and the beading part 121 may be connected to each other by an electrolyte. At this time, the beading part 121 is in a state in which nickel plating is somewhat vulnerable due to the stress caused by molding, and thus may be easily corroded, so that nickel ions may be deposited on the second electrode 112. This eventually causes a problem of low voltage expression.

In order to solve this problem, the adsorption member 140 may be disposed in a region including at least a portion between the electrode assembly 110 and the beading part 121. In the drawing, the adsorption member 140 is formed in a plate shape, and is illustrated as being disposed entirely over the electrode assembly 110.

Specifically, the adsorption member 140 may adsorb an electrolyte by reacting with the electrolyte after a specific time after contacting with the electrolyte. In other words, the adsorption member 140 does not react immediately with the electrolyte injected when assembling the secondary battery 100, but reacts with the electrolyte released in the void V thereafter, to then adsorb the electrolyte.

Therefore, even if the negative electrode expands due to charging after completing the assembling of the secondary battery 100 and the electrolyte is partially pushed into the void V, the adsorption member 140 adsorbs the electrolyte, thereby preventing the beading part 121 from being corroded.

The adsorption member 140 may be formed of, for example, an acrylic binder, oriented polystyrene (OPS), polyvinylidene fluoride (PVdF), or a combination thereof.

In addition, in consideration of the general size of a cylindrical secondary battery, the average amount of electrolyte to be released, or the like, the adsorption member 140 may be formed to a thickness of about 0.3 mm to about 0.6 mm so as to adsorb about 0.05 g to about 0.1 g of electrolyte.

Table 1 below shows the results of placing acrylic binder films (samples) having a thickness of 40 µm in an electrolyte and measuring the total weight for a specific time.

6 the electrolyte released in the void V thereafter, thereby effectively adsorbing the electrolyte.

Figure 4:
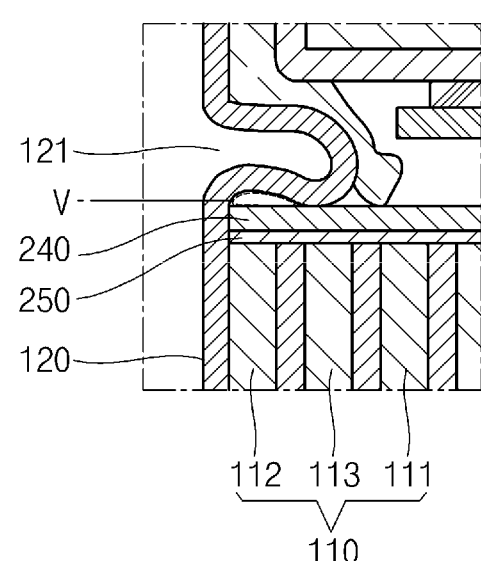
FIG. 4 is a cross-sectional view of a secondary battery according to another embodiment of the present invention, showing an enlarged view of a portion corresponding to the portion III in FIG. 2.

FIG. 4 is a cross-sectional view of a secondary battery 200 according to another embodiment of the present invention, showing an enlarged view of a portion corresponding to the portion III in FIG. 2.

Referring to FIG. 4, the secondary battery 200 according to another embodiment of the present invention differs from the secondary battery 100 according to an embodiment of the present invention, which has been described above with reference to FIGS. 1 to 3 in that the former further comprises an insulation member 250.

The insulation member 250 is made of, for example, polypropylene (PP) or other polymers that do not react with the electrolyte, and is disposed between the electrode assembly 110 and the adsorption member 240.

Accordingly, the lower side of the adsorption member 240 is protected by the insulation member 250, and is not in contact with an electrolyte injected when the secondary battery 200 is assembled, and thus there is an advantage in that the electrolyte to be released later can be more effectively adsorbed without affecting electrolyte impregnation during assembling.

The insulation member 250 may be formed in the form of, for example, a sheet having a thickness of about 0.2 mm. In this case, in consideration of the general size of the cylindrical secondary battery 200 and the average amount of electrolyte to be released, the adsorption member 240 may be formed to a thickness of about 0.2 mm to about 0.4 mm to adsorb about 0.05 g to about 0.1 g of electrolyte.

Alternatively, the insulation member 250 may be formed in the form of, for example, a film having a thickness of

TABLE 1

| | | Initial | 1 H | 2 H | 3 H | 6 H | Day 1 | Day 2 | Day 3 | Day 4 | Day 5 | Day 6 | Day 7 |
|---|---|---|---|---|---|---|---|---|---|---|---|---|---|
| Room temperature | #1 | 25 | 70 | 65 | 60 | 60 | 60 | 60 | 60 | 60 | 60 | 60 | 75 |
| | #2 | 25 | 55 | 55 | 55 | 55 | 60 | 55 | 55 | 60 | 55 | 55 | 55 |
| | #3 | 25 | 55 | 70 | 60 | 60 | 65 | 65 | 65 | 65 | 65 | 65 | 65 |
| | #4 | 25 | 65 | 65 | 65 | 65 | 65 | 60 | 60 | 65 | 60 | 60 | 65 |
| | #5 | 25 | 45 | 60 | 60 | 60 | 60 | 60 | 60 | 60 | 60 | 60 | 65 |
| | #6 | 25 | 60 | 60 | 60 | 60 | 70 | 65 | 65 | 70 | 65 | 65 | 65 |
| | #7 | 25 | 60 | 60 | 60 | 65 | 65 | 60 | 60 | 65 | 60 | 60 | 55 |
| | #8 | 25 | 55 | 55 | 55 | 55 | 60 | 60 | 60 | 60 | 60 | 60 | 75 |
| | #9 | 25 | 55 | 55 | 55 | 55 | 60 | 60 | 60 | 60 | 60 | 60 | 75 |
| | #10 | 30 | 70 | 70 | 70 | 70 | 70 | 70 | 70 | 70 | 70 | 70 | 75 |
| | #11 | 25 | 65 | 65 | 65 | 65 | 65 | 65 | 65 | 65 | 65 | 65 | 65 |
| | #12 | 35 | 65 | 75 | 75 | 70 | 70 | 75 | 75 | 70 | 75 | 75 | 80 |
| High temperature (60° C.) | #1 | 25 | 65 | 65 | 65 | 65 | 65 | 65 | 65 | 65 | 65 | 65 | 80 |
| | #2 | 25 | 70 | 70 | 70 | 70 | 75 | 70 | 70 | 75 | 70 | 70 | 75 |
| | #3 | 25 | 65 | 65 | 65 | 65 | 60 | 60 | 60 | 60 | 60 | 60 | 70 |
| | #4 | 25 | 65 | 65 | 65 | 65 | 65 | 60 | 60 | 65 | 60 | 60 | 80 |
| | #5 | 25 | 60 | 60 | 60 | 60 | 60 | 60 | 60 | 60 | 60 | 60 | 75 |
| | #6 | 20 | 65 | 65 | 65 | 65 | 65 | 65 | 65 | 65 | 65 | 65 | 65 |
| | #7 | 25 | 70 | 70 | 70 | 70 | 70 | 70 | 70 | 70 | 70 | 70 | 80 |
| | #8 | 30 | 65 | 65 | 65 | 65 | 65 | 65 | 65 | 65 | 65 | 65 | 80 |
| | #9 | 25 | 70 | 70 | 70 | 70 | 75 | 70 | 70 | 75 | 70 | 70 | 85 |
| | #10 | 30 | 70 | 70 | 70 | 70 | 70 | 70 | 70 | 70 | 70 | 70 | 75 |
| | #11 | 25 | 60 | 60 | 60 | 60 | 65 | 65 | 65 | 65 | 65 | 65 | 85 |
| | #12 | 35 | 70 | 75 | 70 | 75 | 70 | 75 | 75 | 70 | 75 | 75 | 80 |

(Unit: mg) From the results of 12 experiments at room temperature and high temperature, respectively, it can be seen that the weight increases after about 1 to 2 hours after samples were put in an electrolyte, and the weights were maintained almost constant thereafter.

This indicates that the adsorption member 140 does not react immediately with the electrolyte injected when assembling the secondary battery 100, but reacts sufficiently with about 0.05 mm or less. Accordingly, the thickness of the adsorption member 140 can be increased as much as the thickness of the insulation member 250 is reduced, and thus there is an advantage in that the electrolyte to be released later can be more effectively adsorbed. In this case, the adsorption member 240 may be formed to a thickness of about 0.3 mm to about 0.6 mm to adsorb about 0.05 g to about 0.1 g of electrolyte.

Furthermore, the adsorption member 240 and the insulation member 250 may be coupled to each other by, for example, a double-sided tape, and may be integrally installed in the can 120 during assembling.

Alternatively, the adsorption member 240 and the insulation member 250 may be separately installed in the can 120 during assembling. For example, the insulation member 250 may first be installed on the electrode assembly 110, and the adsorption member 240 may be further installed on the insulation member 250.

In the secondary battery 200 according to another embodiment of the present invention, the other matters are substantially the same as in the secondary battery 100 according to an embodiment of the present invention, which has been described above with reference to FIGS. 1 to 3, or amount to extents to which a person skilled in the art would naturally expect to change according to the foregoing description, a redundant description thereof will be omitted.

Figure 5:
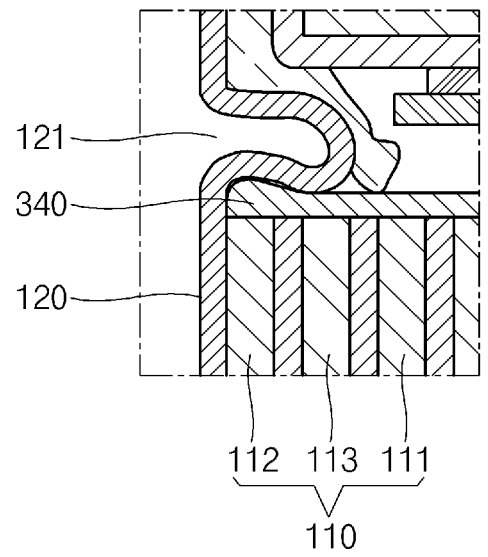
FIG. 5 is a cross-sectional view of a secondary battery according to still another embodiment of the present invention, showing an enlarged view of a portion corresponding to the portion III in FIG. 2.

FIG. 5 is a cross-sectional view of a secondary battery 300 according to still another embodiment of the present invention, showing an enlarged view of a portion corresponding to the portion III in FIG. 2.

Referring to FIG. 5, the secondary battery 300 according to still another embodiment of the present invention differs from the secondary battery 100 according to an embodiment of the present invention, which has been described above with reference to FIGS. 1 to 3 in that an adsorption member 340 is formed in a shape corresponding to the lower portion of a beading part 121. For example, the adsorption member 340 is formed such that the edge thereof slightly convexly protrude upward to fill the void V.

To this end, the adsorption member 340 may be formed by applying a shape related to injection molding, or the shape thereof may be implemented by cutting the remaining region of the adsorption member 340.

In the secondary battery 300 according to still another embodiment of the present invention, the other matters are substantially the same as in the secondary battery 100 according to an embodiment of the present invention, which has been described above with reference to FIGS. 1 to 3, or amount to extents to which a person skilled in the art would naturally expect to change according to the foregoing description, a redundant description thereof will be omitted.

Figure 6:
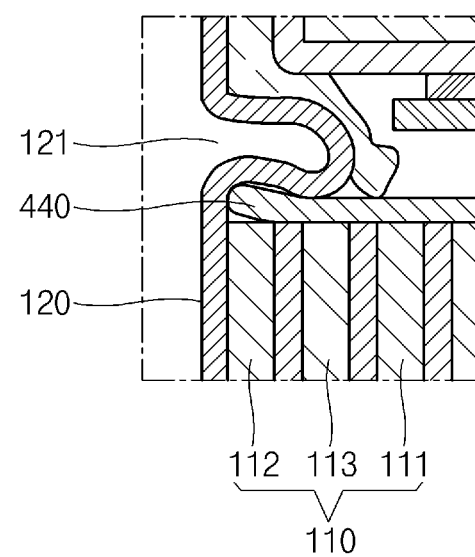
FIG. 6 is a cross-sectional view of a secondary battery according to still another embodiment of the present invention, showing an enlarged view of a portion corresponding to the portion III in FIG. 2.

FIG. 6 is a cross-sectional view of a secondary battery 400 according to still another embodiment of the present invention, showing an enlarged view of a portion corresponding to the portion III in FIG. 2.

Referring to FIG. 6, the secondary battery 400 according to still another embodiment of the present invention is the same as the secondary battery 300 according to still another embodiment of the present invention in that an adsorption member 440 is formed in a shape corresponding to the lower portion of a beading part 121, but differs with respect to the manner in which the shape is implemented.

More specifically, the adsorption member 440 is formed as a thin sheet, and the edge thereof is bent upward to be shaped to fill the void (V).

In the secondary battery 400 according to still another embodiment of the present invention, the other matters are substantially the same as in the secondary battery 300 according to an embodiment of the present invention, which has been described above with reference to FIG. 5, or amount to extents to which a person skilled in the art would naturally expect to change according to the foregoing description, a redundant description thereof will be omitted.

While the foregoing embodiments have been provided for carrying out the secondary batteries 100, 200, 300, and 400 according to the present invention, it should be understood that the embodiment described herein should be considered in a descriptive sense only and not for purposes of limitation, and various changes in form and details may be made therein without departing from the spirit and scope of the disclosure as defined by the following claims.

The invention claimed is:

1. A secondary battery comprising:
an electrode assembly;
a can accommodating the electrode assembly and an electrolyte therein, and having a beading part above the electrode assembly, the beading part being bent from an exterior surface of the can and having a diameter smaller than that of the can at the exterior surface;
a cap assembly sealing the can;
an adsorption member in a space including at least a gap between the electrode assembly and the beading part, and which reacts with the electrolyte after a specific time period lapses after coming into contact with the electrolyte, thereby adsorbing the electrolyte; and
an insulation member made of a material that does not adsorb the electrolyte, the insulation member being located directly adjacent to the electrode assembly and between the electrode assembly and the adsorption member.

2. The secondary battery of claim 1, wherein the adsorption member is made of at least a material containing an acrylic binder, oriented polystyrene (OPS) or polyvinylidene fluoride (PVdF).

3. The secondary battery of claim 1, wherein the insulation member is formed in the form of a film.

4. The secondary battery of claim 1, wherein the adsorption member and the insulation member are coupled to each other.

5. The secondary battery of claim 1, wherein an edge of the adsorption member protrudes toward the beading part.

6. The secondary battery of claim 1, wherein the adsorption member is formed in the form of a sheet, and an edge thereof is bent upward.

7. The secondary battery of claim 1, wherein the adsorption member is only capable of absorbing about 0.05 grams to about 0.1 grams of the electrolyte.

8. The secondary battery of claim 1, wherein the adsorption member has a thickness of about 0.3 mm to about 0.6 mm.

9. The secondary battery of claim 1, wherein the adsorption member is over an entirety of the electrode assembly.

* * * * *